United States Patent
Horton et al.

(10) Patent No.: US 6,559,252 B1
(45) Date of Patent: *May 6, 2003

(54) CATALYSTS AND PROCESSES FOR THE POLYMERIZATION OF OLEFINS

(75) Inventors: Andrew D. Horton, Amsterdam (NL); Jan F. van Baar, Uitgeest (NL); Peter A. Schut, Almere (NL); Gerard M. M. van Kessel, Geldermalsen (NL); Klaas L. von Hebel, Kortenhoef (NL)

(73) Assignee: Basell Technology Company BV, Hoofddorp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/331,917

(22) PCT Filed: Oct. 29, 1997

(86) PCT No.: PCT/EP98/06732

§ 371 (c)(1),
(2), (4) Date: Jun. 29, 1999

(87) PCT Pub. No.: WO99/21899

PCT Pub. Date: May 6, 1999

(30) Foreign Application Priority Data

Oct. 29, 1997 (EP) ............................................ 97203332

(51) Int. Cl.$^7$ ................................................. C08F 4/642
(52) U.S. Cl. ........................ 526/160; 526/92; 526/153; 502/111; 502/117; 502/132
(58) Field of Search ................. 502/111, 117, 502/132; 526/92, 153, 160

(56) References Cited

U.S. PATENT DOCUMENTS 6,476,163 B2 * 11/2002 Van Baar et al. ............ 526/127

FOREIGN PATENT DOCUMENTS

| | | |
|---|---|---|
| EP | 0 384 171 A1 | 8/1990 |
| EP | 0 407 870 A2 | 1/1991 |
| EP | 0 501 370 A1 | 9/1992 |
| EP | 0 575 875 A2 | 12/1993 |
| WO | 96/02580 A1 | 2/1996 |
| WO | WO96/02580 * | 2/1996 |

OTHER PUBLICATIONS

Lardicci et al., Journal of Organometallic Chemistry 39 (1972) pp. 245–250.*
Abstract of Chim. Ind. (Milan) 58(12), 876–877 (1976).
Derwent Abstract of EP 407 870.
Derwent Abstract of EP 501 370.

* cited by examiner

Primary Examiner—David W. Wu
Assistant Examiner—R. Rabago
(74) Attorney, Agent, or Firm—Bryan Cave LLP

(57) ABSTRACT

Catalysts for the polymerization of olefins are disclosed, which comprise the product obtained by contacting: (A) a bridged and/or substituted cyclopentadienyl compound of titanium, zirconium or hafnium; (B) an organometallic aluminium compound of the formula: $Al(CH_2-CR^4R^5-CR^6R^7R^8)_w R^9_q H_z$ wherein $R^4$ is a $C_1-C_{10}$ alkyl, alkenyl, or arylalkyl group; $R^5$ is hydrogen or a $C_1-C_{10}$ alkyl, alkenyl, or arylalkyl group; $R^6$ and $R^7$ are $C_1-C_{10}$ alkyl, alkenyl, aryl, arylalkyl or alkylaryl groups; $R^8$ is hydrogen or a $C_1-C_{10}$ alkyl, alkenyl, aryl, arylalkyl or alkylaryl group; $R^9$ is a $C_1-C_{10}$ alkyl, alkenyl, or arylalkyl group, a carbon atom in the compound of formula (II) being optionally replaced by a Si or Ge atom; w is 1–3, z is 0 or 1, q=3−w−z, and (C) water; the molar ratio (B)/(C) being comprised between 1:1 and 100:1. These catalysts show an improved activity with respect to known catalysts, wherein different aluminium compounds are used.

20 Claims, No Drawings

CATALYSTS AND PROCESSES FOR THE POLYMERIZATION OF OLEFINS

The present invention relates to catalysts for the polymerization of olefins. In particular, it relates to high activity catalysts for the polymerization of olefins obtained from cyclopentadienyl compounds of a transition metal, organometallic aluminium compounds and water.

The invention also relates to processes for the polymerization of olefins carried out in the presence of the catalysts of the invention.

Homogeneous catalytic systems based on metallocene compounds, aluminium alkyl compounds and water are known to be active in the polymerization of olefins.

In European Patent Application EP 384,171, catalysts for the polymerization of olefins are described which comprise the reaction product of:

(a) a metallocene compound of formula:

$$(C_5R'_n)_mR''_p(C_5R'_n)MX_{3-m}$$

wherein $(C_5R'_n)$ is an optionally substituted cyclopentadienyl group and two or four R' substituents of one and the same cyclopentadienyl group can form one or two rings having 4 to 6 carbon atoms; R'' is a divalent radical bridging the two cyclopentadienyl groups; X can be for instance an halogen atom; M is a transition metal selected from Ti, Zr and Hf; p is 0 or 1; m is 0, 1 or 2; when m=0, then p=0 and when p=0, at least one R' substituent is different from hydrogen; n=4 when p=1 and n=5 when p=0; and (b) an alumoxane of the formula:

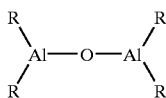

wherein the substituents R can generically be alkyl, alkenyl or alkylaryl radicals, having 2–20 carbon atoms.

The alumoxanes (b) are prepared by reacting the corresponding trialkylaluminium compounds with water in a molar ratio of 2:1. In the embodiment examples, alumoxanes are used in which the R substituents are ethyl, isobutyl or 2-methylpentyl groups.

European Patent Application EP 575,875 describes homogeneous catalytic systems for the polymerization of olefins comprising:

(A) a cyclopentadienyl compound of the formula:

$$(C_5R^1_{x-m}H_{5-x})R^2_m(C_5R^1_{y-m}H_{5-y})_nMQ_{3-n}$$

in which M is Ti, Zr or Hf; $C_5R^1_{x-m}H_{5-x}$ and $C_5R^1_{y-m}H_5$ are equally or differently substituted cyclopentadienyl rings and two or four substituents $R^1$ of the same cyclopentadienyl group can form one or two rings, having from 4 to 6 carbon atoms; $R^2$ is a bridging group which links the two cyclopentadienyl rings; the substituents Q are preferably chlorine atoms; m can be 0 or 1; n can be 0 or 1, being 1 when m=1; x is an integer comprised between m+1 and 5; y is an integer comprised between m and 5;

(B) an organometallic aluminium compound of formula:

$$AlR^4{}_{3-z}H_z$$

wherein the substituents $R^4$ are alkyl, alkenyl or alkylaryl radicals containing from 1 to 10 carbon atoms, optionally containing Si or Ge atoms, at least one of the substituents $R^4$ being different from a straight alkyl group, z is 0 or 1; and (C) water.

The molar ratio between the organometallic aluminium compound (B) and water (C) is comprised between 1:1 and 100:1. In the embodiment examples, only triisobutylaluminium and triisohexylaluminium are used as the organometallic aluminium compounds.

International Patent Application WO96/02580 describes improved catalytic systems comprising:

(A) a cyclopentadienyl compound of formula:

$$(C_5R^1_{x-m}H_{5-x})R^3_m(C_5R^1_{y-m}H_{5-y})_nMQ_{3-n}$$

in which M is Ti, Zr or Hf; $C_5R^1_{x-m}H_{5-x}$ and $C_5R^1_{y-m}H_{5-y}$ are cyclopentadienyl rings substituted in the same way or different ways; the substituents $R^1$, the same or different from each other, are alkyl, alkenyl, aryl, alkylaryl or arylalkyl radicals, which have 1 to 20 carbon atoms and optionally contain Si or Ge atoms or $Si(CH_3)_3$ groups, or two or four substituents $R^1$ of one and the same cyclopentadienyl group can also form one or two rings, having 4 to 6 carbon atoms; $R^2$ is a bridging group linking the two cyclopentadienyl rings and is selected from $CR^3{}_2$, $C_2R^3{}_4$, $SiR^3{}_2$, $Si_2R^3{}_4$, $GeR^3{}_2$, $Ge_2R^3{}_4$, $R^3{}_2SiCR^3{}_2$, $NR^1$ and $PR^1$, wherein the substituents $R^3$, the same or different from each other, are $R^1$ or hydrogen, or two or four substituents $R^3$ can also form one or two rings having 3 to 6 carbon atoms; the substituents Q, the same or different from each other, are halogen, hydrogen, $R^1$, $OR^1$, $SR^1$, $NR^1{}_2$ or $PR^1{}_2$; m can be 0 or 1; n can be 0 or 1, being 1 if m=l; x is an integer ranging from (m+1) to 5; and y is an integer of ranging from m to 5;

(B) an organometallic aluminium compound of formula:

$$Al(CH_2-CR^4R^5R^6)_wR^7{}_yH_z$$

wherein in the $(CH_2-CR^4R^5R^6)$ groups, the same or different from each other, $R^4$ is an alkyl, alkenyl or arylalkyl group, having from 1 to 10 carbon atoms; $R^5$ is an alkyl, alkenyl, aryl, arylalkyl or alkylaryl group, having from 3 to 50 carbon atoms, which is different from a straight alkyl or alkenyl group and, optionally, $R^4$ and $R^5$ fused together can form a ring having from 4 to 6 carbon atoms; $R^6$ is hydrogen or an alkyl, alkenyl or arylalkyl group, having from 1 to 10 carbon atoms; the $R^7$ substituents, the same or different from each other, are alkyl, alkenyl, aryl, arylalkyl or alkylaryl radicals, containing from 1 to 10 carbon atoms, optionally containing Si or Ge atoms; w is 1, 2 or 3; z is 0 or 1; y=3−w−z; and (C) water.

The molar ratio between the organometallic aluminium compound (B) and water (C) is comprised between 1:1 and 100:1. The only organometallic aluminium compounds disclosed are those wherein the $(CH_2-CR^4R^5R^6)$ groups are 2,4,4-trimethyl-pentyl, 2-phenyl-propyl or 1-butene oligomers.

However, the catalysts described in the above-cited patent applications exert activities in the polymerization of olefins which are not completely satisfactory. Therefore, the problem addressed by the present invention is to improve the activities of the above-discussed known catalysts.

To solve this problem, novel catalysts have unexpectedly been found which are suitable for the polymerization of olefins and possess a considerably improved activity compared with the known catalysts.

Thus, according to a first object, the present invention provides a catalyst for the polymerization of olefins comprising the product obtained by contacting the following components:

(A) a cyclopentadienyl compound of formula (I):

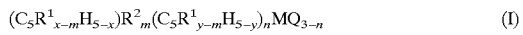

$(C_5R^1_{x-m}H_{5-x})R^2_m(C_5R^1_{y-m}H_{5-y})_n MQ_{3-n}$  (I)

wherein M is Ti, Zr or Hf; $C_5R^1_{x-m}H_{5-x}$ and $C_5R^1_{y-m}H_{5-y}$ are equally or differently substituted cyclopentadienyl rings; the substituents $R^1$, the same or different from each other, are selected from the group consisting of a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl groups radicals, optionally containing Si or Ge atoms or $Si(CH_3)_3$ groups, or two or four substituents $R^1$ of the same cyclopentadienyl group form one or two rings, having 4 to 6 carbon atoms; $R^2$ is a bridging group between the two cyclopentadienyl rings and is selected from the group consisting of $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, wherein the substituents $R^3$, the same or different from each other, are hydrogen or have the same meaning of $R^1$, or two or four substituents $R^3$ form one or two rings, having 3 to 6 carbon atoms; the substituents Q, the same or different from each other, are selected from the group consisting of halogen, hydrogen, $R^1$, $OR^1$, $SR^1$, $NR^1_2$ and $PR^1_2$; m is 0 or 1; n is 0 or 1, being 1 when m=1; x ranges from (m+1) to 5; and y ranges from m to 5;

(B) an organometallic aluminium compound of formula (II):

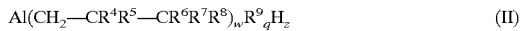

$Al(CH_2—CR^4R^5—CR^6R^7R^8)_w R^9_q H_z$  (II)

wherein $R^4$ is a linear or branched, saturated or unsaturated $C_1$–$C_{10}$ alkyl or $C_7$–$C_{20}$ arylalkyl group; $R^5$ is hydrogen or a linear or branched, saturated or unsaturated $C_1$–$C_{10}$ alkyl or $C_7$–$C_{10}$ arylalkyl group; $R^6$ and $R^7$, the same or different from each other, are linear or branched, saturated or unsaturated $C_1$–$C_{10}$ alkyl, $C_6$–$C_{10}$ aryl, $C_1$–$C_{10}$ arylalkyl or alkylaryl groups; the substituents $R^4$ and $R^6$ and/or $R^6$ and $R^7$ optionally form one or two rings, having 3 to 6 carbon atoms; $R^8$ is hydrogen or a linear or branched, saturated or unsaturated $C_1$–$C_{10}$ alkyl, $C_6$–$C_{10}$ aryl, $C_7$–$C_{10}$ arylalkyl or $C_7$–$C_{10}$ alkylaryl group; $R^9$ is a linear or branched, saturated or unsaturated $C_1$–$C_{10}$ alkyl or $C_1$–$C_{10}$ arylalkyl group, a carbon atom in the compound of formula (II) being optionally replaced by a Si or a Ge atom; w is 1, 2 or 3; z is 0 or 1; q=3−w−z; and (C) water.

The molar ratio between the organometallic aluminium compound (B) and water (C) preferably ranges from 1:1 to 100:1, and more preferably from 1:1 to 50:1. A suitable value for the $Al/H_2O$ molar ratio is 2.

The molar ratio between the organometallic aluminium compound (B) and the cyclopentadienyl compound (A), calculated as Al/M molar ratio, preferably ranges from 50 to 50000, and more preferably from 500 to 5000.

In the cyclopentadienyl compounds of formula (I), the metal M is preferably zirconium. When in formula (I) m=0, $C_5R^1_{x-m}H_{5-x}$ and $C_5R^1_{y-m}H_{5-y}$ are preferably pentamethylcyclopentadienyl, indenyl or 4,5,6,7-tetrahydroindenyl; the Q substituents are preferably chlorine atoms or $C_1$–$C_7$ hydrocarbyl groups, and more preferably are methyl groups.

Non-limiting examples of cyclopentadienyl compounds of formula (I), wherein m=0, are:

| | | |
|---|---|---|
| $(Me_3Cp)_2MCl_2$ | $(Me_4Cp)_2MCl_2$ | $(Me_5Cp)_2MCl_2$ |
| $(Me_5Cp)_2MMe_2$ | $(Me_5Cp)_2M(OMe)_2$ | $(Me_5Cp)_2M(C_6H_5)_2$ |
| $(Me_5Cp)_2M(CH_3)Cl$ | $(EtMe_4Cp)_2MCl_2$ | $[(C_6H_5)Me_4Cp]_2MCl_2$ |
| $(Et_5Cp)_2MCl_2$ | $(Me_5Cp)_2M(C_6H_5)Cl$ | $(Ind)_2MCl_2$ |
| $(Ind)_2MMe_2$ | $(H_4Ind)_2MCl_2$ | $(H_4Ind)_2MMe_2$ |
| $[(Si(CH_3)_3Cp]_2MCl_2$ | $\{[Si(CH_3)_3]_2Cp\}_2MCl_2$ | $(Me_4Cp)(Me_5Cp)MCl_2$ |
| $(Me_5Cp)MCl_3$ | $(Me_5Cp)MBenz_3$ | $(Ind)MBenz_3$ |
| $(H_4Ind)MBenz_3$ | | | wherein Me=methyl, Et=ethyl, Cp=cyclopentadienyl, Ind=indenyl, $H_4Ind$=4,5,6,7-tetrahydroindenyl, Benz=benzyl; M is preferably Zr.

When in formula (I) m=1, $C_5R^1_{x-m}H_{5-x}$ and $C_5R^1_{y-m}H_{5-y}$ are preferably tetramethyl-cyclopentadienyl, indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl or fluorenyl groups; preferably $(CH_3)_2Si<$ or $—CH_2CH_2—$; the Q substituents are preferably chlorine or $C_1$–$C_7$ hydrocarbyl groups, and more preferably methyl groups.

Non-limiting examples of cyclopentadienyl compounds of formula (I), wherein m=1, are:

| | | |
|---|---|---|
| $Me_2Si(Me_4Cp)_2MCl_2$ | $Me_2Si(Me_4Cp)_2MMe_2$ | $Me_2C(Me_4Cp)(MeCp)MCl_2$ |
| $Me_2Si(Ind)_2MCl_2$ | $Me_2Si(Ind)_2MMe_2$ | $Me_2Si(Me_4Cp)_2MCl(OEt)$ |
| $C_2H_4(Ind)_2MCl_2$ | $C_2H_4(Ind)_2MMe_2$ | $C_2H_4(Ind)_2M(Nme_2)_2$ |
| $C_2H_4(H_4Ind)_2MCl_2$ | $C_2H_4(H_4Ind)_2MMe_2$ | $C_2H_4(H_4Ind)_2M(NMe_2)OMe$ |
| $Ph(Me)Si(Ind)_2MCl_2$ | $Ph_2Si(Ind)_2MCl_2$ | $Me_2C(Flu)(Cp)MCl_2$ |
| $C_2H_4(Me_4Cp)_2MCl_2$ | $C_2Me_4(Ind)_2MCl_2$ | $Me_2SiCH_2(Ind)_2MCl_2$ |
| $C_2H_4(2-MeInd)_2MCl_2$ | $C_2H_4(3-MeInd)_2MCl_2$ | $C_2H_4(4,7-Me_2Ind)_2MCl_2$ |
| $C_2H_4(5,6-Me_2Ind)_2MCl_2$ | $C_2H_4(2-MeH_4Ind)_2MCl_2$ | $C_2H_4(2,4,7-Me_3H_4Ind)_2MCl_2$ |
| $C_2H_4(4,7-Me_2H_4Ind)_2MCl_2$ | $C_2H_4(2,4,7-Me_3Ind)_2MCl_2$ | |
| $C_2H_4(2-Me-Benz[e]Ind)_2MCl_2$ | $C_2H_4(Benz[e]Ind)_2MCl_2$ | |
| $Me_2Si(2-MeInd)_2MCl_2$ | $Me_2Si(4,7-Me_2Ind)_2MCl_2$ | |
| $Me_2Si(5,6-Me_2Ind)_2MCl_2$ | $Me_2Si(2,4,7-Me_3Ind)_2MCl_2$ | |
| $Me_2Si(2-MeH_4Ind)_2MCl_2$ | $Me_2Si(4,7-Me_2H_4Ind)_2MCl_2$ | |
| $Me_2Si(2,4,7-Me_3H_4Ind)_2MCl_2$ | $Me_2Si(Benz[e]Ind)_2MCl_2$ | |
| $Me_2Si(2-Me-Benz[e]Ind)_2MCl_2$ | | | wherein Me=methyl, Cp=cyclopentadienyl, Ind=indenyl, Flu=fluorenyl, Ph=phenyl, $H_4Ind$=4,5,6,7-tetrahydroindenyl; M is preferably Zr.

In the organometallic aluminium compounds of formula (II), $R^4$ is preferably a $C_1$–$C_5$ alkyl group, more preferably a $C_1$–$C_3$ alkyl group, and even more preferably a methyl or ethyl group; $R^5$ is preferably hydrogen; $R^6$ and $R^7$ are preferably $C_1$–$C_5$ alkyl groups, more preferably $C_1$–$C_3$ alkyl groups; $R^8$ is preferably hydrogen or a $C_1$–$C_5$ alkyl group, more preferably a $C_1$–$C_3$ alkyl group; w is preferably 2 or 3, more preferably 3; when q is different from 0, $R^9$ is preferably a $C_1$-$C_5$ alkyl group, more preferably a branched alkyl group, even more preferably isobutyl.

According to the invention, component (B) can suitably comprise a mixture of two or more organometallic aluminum compounds of formula (II). Moreover, Component (B) can be used in combination with other organometallic aluminum compounds, other than those of formula (II), or in mixture with other compatible cocatalysts known in the state of the art.

In the organometallic aluminium compounds of formula (II), z is 0 or 1. As it is known in the state of the art, aluminium trisalkyls may contain small amounts of bisalkyl-aluminium hydride; the hydride content can slightly change during prolonged storage periods and depending on the storage temperature. Therefore, according to a preferred embodiment of the invention, component (B) is a mixture of the two organometallic aluminium compounds of formula (II) wherein z=0 and z=1, so that the molar ratio between the hydrogen atoms directly bound to aluminium and aluminium atoms (i.e. the overall z value) is lower than 0.8, and even more preferably ranges from 0.05 to 0.3. Mixtures of organometallic aluminium compounds having said overall z values can be prepared with methods known in the state of the art, for instance by mixing the corresponding trisalkylaluminium and bisalkylaluminium hydride in appropriate molar ratios.

Non-limiting examples of organometallic aluminium compounds (B) of formula (II), according to the present invention, are:

tris(2,3,3-trimethyl-butyl)aluminium,
tris(2,3-dimethyl-hexyl)aluminium,
tris(2,3-dimethyl-butyl)aluminium,
tris(2,3-dimethyl-pentyl)aluminium,
tris(2,3-dimethyl-heptyl)aluminium,
tris(2-methyl-3-ethyl-pentyl)aluminium,
tris(2-methyl-3-ethyl-hexyl)aluminium,
tris(2-methyl-3-ethyl-heptyl)aluminium,
tris(2-methyl-3-propyl-hexyl)aluminium,
tris(2-ethyl-3-methyl-butyl)aluminium,
tris(2-ethyl-3-methyl-pentyl)aluminium,
tris(2,3-diethyl-pentyl)aluminium,
tris(2-propyl-3-methyl-butyl)aluminium,
tris(2-isopropyl-3-methyl-butyl)aluminium,
tris(2-isobutyl-3-methyl-pentyl)aluminium,
tris(2,3,3-trimethyl-pentyl)aluminium,
tris(2,3,3-trimethyl-hexyl)aluminium,
tris(2-ethyl-3,3-dimethyl-butyl)aluminium,
tris(2-ethyl-3,3-dimethyl-pentyl)aluminium,
tris(2-isopropyl-3,3-dimethyl-butyl)aluminium,
tris(2-trimethylsilyl-propyl)aluminium,
tris(2-methyl-3-phenyl-butyl)aluminium,
tris(2-ethyl-3-phenyl-butyl)aluminium,
tris(2,3-dimethyl-3-phenyl-butyl)aluminium,
tris(1-menthen-9-yl)aluminium, as well as the corresponding compounds wherein one of the hydrocarbyl groups is replaced by a hydrogen atom, and those wherein one or two of the hydrocarbyl groups are replaced by an isobutyl group. Particularly preferred compounds are tris(2,3,3-trimethyl-butyl)aluminium and tris(2,3-dimethyl-butyl)aluminium.

The components of the catalysts of the present invention can be brought into contact in different ways. It is possible for instance, to contact first the aluminium compound (B) with water (C) and subsequently to bring the thus obtained reaction product into contact with the cyclopentadienyl compound (A).

Therefore, a preferred embodiment of the present invention is a catalyst for the polymerization of olefins comprising the product obtained by contacting the following components:

(A) a cyclopentadienyl compound of formula (I):

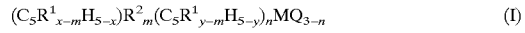

$$(C_5R^1_{x-m}H_{5-x})R^2_m(C_5R^1_{y-m}H_{5-y})_nMQ_{3-n} \qquad (I)$$

wherein M, $C_5R^1_{x-m}H_{5-x}$, $C_5R^1_{y-m}H_{5-y}$, $R^2$, Q, m and n have the meaning reported above; and (B') the product of the reaction between water and an organometallic aluminium compound of formula (II):

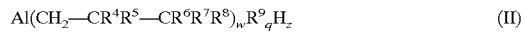

$$Al(CH_2\text{—}CR^4R^5\text{—}CR^6R^7R^8)_wR^9_qH_z \qquad (II)$$

wherein $R^4$, $R^5$, $R^6$, $R^7$, $R^8$, $R^9$, w, z and q have the meaning reported above.

The molar ratio between said organometallic aluminium compound and said water preferably ranges from 1:1 to 100:1; more preferably from 1:1 to 50:1; even more preferably, the Al/$H_2O$ molar ratio is 2. The expression "product of reaction" means the product obtained by contacting the mentioned components.

The molar ratio between said organometallic aluminium compound and said cyclopentadienyl compound, expressed as Al/M molar ration, preferably ranges from 50 to 50000, more preferably from 500 to 5000.

The components of the catalysts of the present invention can be brought into contact by other methods known in the state of the art, such as by first contacting said organometallic aluminium compound with said cyclopentadienyl compound and, thereafter, with water.

According to an embodiment of the invention, water can be gradually added to said organometallic aluminium compound in solution, in an aliphatic or aromatic inert hydrocarbon solvent, such as heptane or toluene. Thereafter, the thus obtained solution is contacted with a solution of said cyclopentadienyl compound in a suitable solvent, such as toluene.

According to another embodiment of the invention, water can be introduced in the monomer or in one of the monomers to be polymerized. In this case, said organometallic aluminium compound and said cyclopentadienyl compound are precontacted before being used in the polymerization.

According to another embodiment of the invention, water can be reacted in a combined form as a hydrated salt, or it can be adsorbed or absorbed on an inert support such as silica.

According to a further embodiment, said organometallic aluminium compound can be allowed to react with boric anhydride and with boric acid.

The catalysts of the present invention can be used on inert supports. This is achieved by depositing said cyclopentadienyl compound, or the product of the reaction thereof with the aluminium compound pre-reacted with water, or said organometallic aluminium compound pre-reacted with water and subsequently said cyclopentadienyl compound, on inert supports such as silica, alumina, styrene/divinylbenzene copolymers, polyethylene or polypropylene.

The thus obtained solid compound, together with further addition of said organometallic aluminium compound, either as such or pre-reacted with water, can be suitably used in gas phase polymerisations.

The catalysts of the present invention can be used in the polymerization reactions of olefins. Therefore, according to further object, the invention provides a process for the polymerization of an olefin in the presence of a catalyst as described above. Olefins which can be polymerized with the process of the present invention are, for instance, α-olefins of formula $CH_2=CHR$, wherein R hydrogen or a $C_1-C_{20}$ alkyl radical.

The catalysts according to the present invention can be conveniently used in the homopolymerization of ethylene, in particular for the preparation of HDPE, and in the copolymerization of ethylene, in particular for the preparation of LLDPE. The LLDPE copolymers which can be prepared have a content of ethylene units ranging from 80 to 99 mol %; their density ranges from 0.87 to 0.95 g/cm³ and they are characterized by a uniform distribution of the α-olefin units along the polymeric chain.

Suitable comonomers in ethylene copolymers are α-olefins of formula $CH_2=CHR$, wherein R is a linear, branched or cyclic $C_1-C_{20}$ alkyl radical, and cycloolefins. Examples of such olefins are propylene, 1-butene, 1-pentene, 4-methyl-1-pentene, 1-hexene, 1-octene, allylcyclohexane, cyclopentene, cyclohexene, norbornene and 4,6-dimethyl-1-heptene. The $CH_2=CHR$ or cycloolefin units are preferably present in the final copolymers in a quantity ranging from 1 to 20 mol %.

Suitable comonomers in said ethylene copolymers are polyenes, in particular conjugated or non-conjugated, linear or cyclic dienes, such as 1,4-hexadiene, isoprene, 1,3-butadiene, 1,5-hexadiene and 1,6-heptadiene.

The catalysts of the invention can be suitably used in propylene homopolymerization, in particular for the production of isotactic polypropylene.

Moreover, the catalysts of the invention can be suitably used in the preparation of elastomeric copolymers of ethylene with a-olefins of formula $CH_2=CHR$, wherein R is a $C_1-C_{10}$ alkyl radical, said copolymers optionally containing minor proportions of units deriving from polyenes.

The saturated elastomeric copolymers obtainable with the catalysts of the present invention preferably contain from 15 to 85 mol % of ethylene units, the complement to 100% consisting of units of one or more α-olefins and/or non-conjugated diolefins able to cyclopolymerise. The unsaturated elastomeric copolymers may also contain, in addition to ethylene and α-olefin units, minor proportions of unsaturated polyene units; the content of unsaturated units can vary from 0.1 to 5% by moles and it is preferably comprised between 0.2 and 2% by moles.

The elastomeric copolymers obtainable with the catalysts of the invention are endowed with valuable properties, such as a low content of ashes and homogeneous distribution of the comonomers along the copolymeric chain.

α-olefins which can be suitably used as comonomers in said elastomeric copolymers are propylene, 1-butene, 4-methyl-1-pentene, 1-hexene and 1-octene.

Polyenes which can be suitably used in said elastomeric copolymers comprise:

polyenes able to give unsaturated units, such as:
linear, non-conjugated dienes such as 1,4-hexadiene trans, 1,4-hexadiene cis, 6-methyl-1,5-heptadiene, 3,7-dimethyl-1,6-octadiene, 11-methyl-1,10-dodecadiene;
monocyclic diolefins such as, for example, cis-1,5-cyclooctadiene and 5-methyl-1,5-cyclooctadiene;
bicyclic diolefins such as for example 4,5,8,9-tetrahydroindene and 6 and/or 7-methyl-4,5,8,9-tetrahydroindene;
alkenyl or alkylidene norbornenes such as for example, 5-ethyliden-2-norbornene, 5-isopropyliden-2-norbornene, exo-5-isopropenyl-2-norbornene, 5-vinyl-2-norbornene;
polycyclic diolefins such as, for example, dicyclopentadiene, tricyclo-[6.2.1.0$^{2.7}$]4,9-undecadiene and the 4-methyl derivative thereof;
non-conjugated diolefins able to cyclopolymerise, such as 1,5-hexadiene, 1,6-heptadiene, 2-methyl-1,5-hexadiene; conjugated dienes, such as butadiene, 1,3-pentadiene and isoprene.

According to a further embodiment, the catalysts according to the present invention are used in the preparation of cycloolefin polymers. Monocyclic and polycyclic olefin monomers can be either homopolymerized or copolymerized, also with linear olefin monomers. Non limitative examples of cycloolefin polymers which can be prepared with the catalyst of the present invention are described in the European patent applications EP 0 501 370 and EP 0 407 870.

The polymerization processes of the present invention can be carried out in liquid phase, optionally in the presence of an inert hydrocarbon solvent, or in gas phase. Said hydrocarbon solvent can be either aromatic (such as toluene) or aliphatic (such as propane, hexane, heptane, isobutane, cyclohexane and 2,2,4-trimethylpentane).

Polymerization temperature preferably ranges from 0° C. to 250° C.; in the preparation of HDPE and LLDPE, it is preferably comprised between 20° C. and 150° C. and, more particularly between 40° C. and 90° C.; in the preparation of elastomeric copolymers, it is preferably comprised between 0° C. and 200° C., and more preferably between 20° C. and 100° C.

The molecular weight of the (co)polymers can be varied simply by varying polymerization temperature, the type or the concentration of the catalyst components, or by using molecular weight regulators, such as hydrogen.

The molecular weight distribution can be varied by using mixtures of different cyclopentadienyl compounds or by carrying out the polymerization in several stages which differ in the polymerization temperature and/or the concentrations of molecular weight regulator.

The polymerization yield depends on the purity of the cyclopentadienyl components (A) in the catalyst. Therefore, said cyclopentadienyl component can be used as such or can be subjected to purification treatments before use.

Particularly interesting results are obtained when the components of the catalyst of the invention are contacted among them before the polymerization. The contact time is preferably comprised between 1 and 60 minutes, more preferably between 5 and 20 minutes. The precontact concentrations for the cyclopentadienyl compound are comprised between $10^{-2}$ and $10^{-8}$ mol/l, while for the product of the reaction between the organometallic aluminium compound and water they are comprised between 10 and $10^{-3}$ mol/l. The precontact is preferably carried out in the presence of a hydrocarbon solvent and, optionally, of small amounts of monomer.

With the exception of tris(2,3,3-trimethyl-butyl)aluminium, tris(2,3-dimethyl-butyl)aluminium and tris(1-menthen-9-yl)aluminium, which were described in *Chim. Ind. (Milan)* (1976), 58(12), pages 876–7, and *Liebigs Ann. Chem.*, vol. 629, pages 14–19 respectively, the organometallic aluminum compounds of formula (II), as reported above, are new in the state of the art. Therefore, a further object of the present invention is an organometallic aluminium compound of formula (II):

wherein $R^4-R^9$, q, w and z have the meaning reported above, with the exclusion of tris(2,3,3-trimethyl-butyl)aluminium, tris(2,3-dimethyl-butyl)aluminium and tris(1-menthen-9-yl) aluminium.

$R^4$ is preferably methyl and $R^5$ is preferably hydrogen and, according to a particular embodiment of the organometallic aluminum compounds of the invention, $R^6$ has at least two carbon atoms. The variable w is preferably 2 or 3.

It is another object of the present invention a process for preparing compounds of formula (II), as reported above, wherein w is about 3 and $R^5$ is hydrogen, said process comprising reacting:

(a) an alkene of formula $CH_2$=$CR^4$—$CR^6R^7R^8$, wherein $R^4$, $R^6$, $R^7$ and $R^8$ have the meaning reported above, and (b) an aluminium compound of formula $AlR^{10}_3$, wherein the $R^{10}$ substituents, the same or different from each other, are hydrogen or alkyl radicals containing a β-hydrogen substituent having a number of carbon atoms lower than that of the alkene (a).

$R^{10}$ is preferably hydrogen or a $C_2$–$C_4$ alkyl; particularly preferred compounds (b) are triisobutylaluminium and diisobutylaluminium hydride.

Compound (a) must be present in a molar amount at least three times higher than that of compound (b). The reaction can be suitably performed in a hydrocarbon solvent, such as toluene or p-xylene, or for some higher olefins in the absence of added solvents; the temperature is preferably comprised between 100° C. and 140° C., depending on the solvent and the reactants employed.

The thus obtained compounds of formula (II) generally contain small amounts of the corresponding dialkylaluminium hydride, due to beta-elimination at high temperatures; in fact, the hydride content, besides depending on the nature of the alkyl groups, increases with the thermolysis temperature. Therefore, in order to obtain hydride-free trialkylalurninium compounds, the removal of the solvent and of the excess olefin is carried out with care, at temperatures preferably lower than 50° C.

The following examples are given for illustrative and not limitative purposes.

SYNTHESIS OF THE CATALYTIC COMPONENTS

The components of the catalysts were prepared as follows:

CYCLOPENTADIENYL COMPOUNDS
rac-Et(1-Ind)$_2$ZrCl$_2$ (r-EBIZrCl$_2$)

This was prepared according to the procedure described in EP 575,875.

rac-Me$_2$Si(1-Ind)$_2$ZrCl$_2$

The product commercially available from Witco was used. $^1$H NMR spectroscopy showed the isomeric purity to be >95% rac.

ORGANOALUMINIUM COMPOUNDS
General Procedures

All reactions were carried out under nitrogen in the glove box or under Schlenk conditions using oven-dried glassware. The toluene solvent was dried by refluxing over Na/benzophenone and the xylene solvent (Aldrich anhydrous grade) was dried over 4Å molecular sieves. All alkenes were dried over 4 Å molecular sieves prior to use.
tris(2,3-Dimethyl-hexyl)aluminium (TDMHA)

In a glove box, $CH_2$=C(Me)CHMeCH$_2$CH$_2$Me (96.3 g, 0.860 mol; "98%" ex-Wiley) was dissolved in toluene in a 500 ml 3-neck flask. HAl{CH$_2$CHMe$_2$}$_2$ (HDIBA, 35.0 ml, 0.139 mol, ex-Witco) was added over 10 min by syringe to the rapidly stirred solution at ambient temperature. The stoppered reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 35 minutes to an internal temperature of 112.3° C. The reaction was allowed to reflux for 20 h (final reflux temperature 117.2° C.), affording ca. 100% of the theoretical maximum yield of isobutene (ca. 2.0 equivalents/Al). The remaining olefin and solvent were removed in vacuo (80° C., 0.05 mbar, 90 min) utilizing a dry ice/acetone bath to give 51.7 g (99% yield based on HDIBA) of tris(2,3-dimethyl-hexyl)aluminium (TDMHA). The colorless oil was shown by NMR spectroscopy to be a clean mixture of two (diasteromeric) species, showing negligible AlH or AlOR contaminant levels.
tris(2,3,3-Trimethyl-butyl)aluminium (TTMBA)

In the glove box, $CH_2$=C(Me)(CMe$_3$) (81.5 g, 0.831 mol; "99%" ex-Wiley) was dissolved in dry p-xylene (ca. 145 ml) in a 500 ml 3-neck flask. Al{CH$_2$CHMe$_2$}$_3$ (TIBA, 35.0 ml, 0.139 mol, ex-Witco) was added over 10 min by syringe to the rapidly stirred solution. The stoppered reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 35 minutes to an internal temperature of 105.6° C. The reaction was allowed to reflux for 20 h (final reflux temperature 121.2° C.), affording ca. 95% of the theoretical maximum yield of isobutene (ca. 2.9 equivalents/Al). Despite the low boiling point of $CH_2$=C(Me)(CMe$_3$), only a negligible amount of this olefin was collected in the cold trap. The remaining olefin and solvent were removed in vacuo (80° C., 0.05 mbar, 90 min) utilizing a dry ice/acetone bath to give 43.0 g (95.5% yield based on TIBA) of tris(2,3,3-trimethyl-butyl)aluminium (TTMBA). The colorless oil was shown by NMR spectroscopy to be a clean single species, showing no sign of AlH or AlOR resonances.
tris(2,3-Dimethyl-butyl)aluminium (TDMBA)

TDMBA was prepared analogously to TTMBA from the reaction of $CH_2$=CHMeCHMe$_2$ (42.6 g, 0.507 mol, 99% ex-Wiley) with TIBA (21.4 ml, 0.085 mol, ex-Witco) in dry xylene (90 ml; isomer mixture) in a 500 ml 3-neck flask. The mixture was allowed to reflux for 20 h (range reflux temperature: 85–109° C.), affording 30 ml of volatile material in the dry ice trap consisting of ca. 8 ml of $CH_2$=CHMeCHMe, and ca. 22 ml of isobutene (ca. 100% of theoretical). The remaining olefin and solvent were removed in vacuo (60° C., 0.7 mbar, 90 min) utilizing a dry ice/acetone trap to give 23.4 g (97% yield based on TIBA) of tris(2,3-dimethyl-butyl)aluminium (TDMBA). The colorless oil was shown by $^1$H and $^{13}$C NMR spectroscopy to be clean TDMBA contaminated by 4% (molar basis) of Al(CH$_2$CHMe$_2$)(CH$_2$CHMeCH$_2$Me$_2$)$_2$; no NMR resonances due to AlH or AlOR fragments were observed.
tris(2,3-Dimethyl-pentyl)aluminium (TDMPA)

TDMPA was prepared analogously to TTMBA from the reaction of $CH_2$=CHMeCHMeCH$_2$Me (50.0 g, 0.510 mol, 99% ex-Wiley) with TIBA (21.4 ml, 0.085 mol, ex-Witco) in dry m-xylene (105 ml) in a 500 ml 3-neck flask. The mixture was allowed to reflux for 16 h (range reflux temperature: 105–120° C.), affording 25 ml of volatile material in the dry ice trap consisting of ca. 3 ml of $CH_2$=CHMeCHMeCH$_2$Me and ca. 22 ml of isobutene (ca. 100% of theoretical). The remaining olefin and solvent were removed in vacuo (60° C., 0.7 mbar, 60 min) utilizing a dry ice/acetone trap to give 25.9 g (95% yield based on TIBA) of tris(2,3-dimethyl-pentyl)aluminium (TDMPA). The colorless oil was shown by $^1$H and $^{13}$C NMR spectroscopy to be a clean 1:1 diasteromeric mixture; no NMR resonances due to AlH or AlOR fragments were observed.

tris(2-Methyl-3-ethyl-pentyl)aluminium (TMEPA)

TMEPA was prepared analogously to TTMBA from the reaction of $CH_2$=CHMeCHEt$_2$ (63.2 g, 0.564 mol, "98%" ex-Wiley, contained ca. 3% of $Me_2C$=CEt$_2$) with TIBA (24.0 ml, 0.095 mol, ex-Witco) in dry xylene (98 ml; isomer mixture) in a 500 ml 3-neck flask. The mixture was allowed to reflux for 21 h (range reflux temperature: 113–128° C.), affording ca. 100% of theoretical amount of isobutene in the dry ice trap. The remaining olefin and solvent were removed in vacuo (60° C., 0.3 mbar, 90 min) utilizing a dry ice/acetone bath to give 32.0 g (91% yield based on TIBA) of tris(2-methyl-3-ethyl-pentyl)aluminium (TMEPA). The colorless oil was shown by $^1$H and $^{13}$C NMR spectroscopy to consist primarily of TMEPA, containing traces of unidentified contaminants (AlH or AlOR species).

tris(2-Ethyl-3-methyl-butyl)aluminium (TEMBA)

TEMBA was prepared analogously to TTMBA from the reaction of $CH_2$=CEt(CHMe$_2$) (38.0 g, 0.388 mol, "93%" ex-Wiley) with TIBA (16.0 mL, 0.063 mol, ex-Witco) in dry xylene (80 mL; isomer mixture) in a 250 mL 3-neck flask. A transitory yellow colour was observed on mixing the reagents. The mixture was allowed to reflux for 18 h (range reflux temperature: 112–125° C.), affording ca. 100% of the theoretical amount of isobutene in the dry ice trap. The remaining olefin and solvent were removed in vacuo (90° C., 0.6 mbar, 90 min) utilizing a dry ice/acetone bath to give 20.2 g (90% yield based on TIBA) of tris(2-ethyl-3-methyl-butyl)aluminium (TEMBA). The colourless liquid was shown by $^1$H and $^{13}$C NMR spectroscopy to contain traces of AlH species.

tris(2-Ethyl-3-methyl-pentyl)aluminium (TEMPA)

TEMPA was prepared analogously to TTMBA from the reaction of $CH_2$=CEt(CHMeCH$_2$Me) (31.0 g, 0.277 mol, 99% ex-Wiley) with TIBA (11.8 mL, 0.047 mol, ex-Witco) in dry xylene (69 mL; isomer mixture) in a 500 mL 3-neck flask. The mixture was allowed to reflux for 16 h (range reflux temperature: 120–133° C.), affording ca. 100% of the theoretical amount of isobutene in the dry ice trap. The remaining olefin and solvent were removed in vacuo (60° C., 0.7 mbar, 90 min) utilizing a dry ice/acetone trap to give 32.0 g (91% yield based on TIBA) of tris(2-ethyl-3-methyl-pentyl)aluminium (TEMPA). The colourless liquid was shown by $^1$H and $^{13}$C NMR spectroscopy to be a clean 1:1 diastereomeric mixture exhibiting no NMR resonances due to AlH or AlOR fragments. After storage in a closed container for one year (prior to polymerization testing), partial formation of AlH species was observed.

tris(2-Isopropyl-3-methyl-butyl)aluminium (TIMBA)

TIMBA was prepared analogously to TTMBA from the reaction of $CH_2$=C(CHMe$_2$)$_2$ (53.6 g, 0.479 mol, ex-Wiley; contained 1.5% $CMe_2$=CMeCHMe$_2$) with TIBA (20.2 mL, 0.080 mol, ex-Witco) in dry xylene (86 mL; isomer mixture) in a 500 mL 3-neck flask. The mixture was allowed to reflux for 20 h (range reflux: 115–130° C.) affording ca 100% of the theoretical amount of isobutene in the dry ice trap. The remaining olefin and solvent were removed in vacuo (55° C., 0.3 mbar, 90 min) utilizing a dry ice trap to give 28.0 g (95% yield based on TIBA) of tris(2-isopropyl-3-methyl-butyl) aluminium (TIMBA). The colourless liquid was shown by $^1$H and $^{13}$C NMR spectroscopy to be free of AlH or AlOR species.

tris(1-Menthen-9-yl)aluminium (TMENA)

TMENA was prepared analogously to TTMBA from the reaction of (R)-(+)-limonene (247.5 g, 1.82 mol, 98% ex-Aldrich) with TIBA (60.0 g, 0.30 mol, ex-Witco) in dry toluene (310 mL) in a 1 L 3-neck flask. The mixture was allowed to reflux for 22 h (reflux temperature 125° C.) affording ca 100% of the theoretical amount of isobutene in the dry ice trap. The remaining olefin and solvent were removed in vacuo (70° C., 0.06 mbar, 60 min) to give 131.5 g (99% yield based on TIBA) of tris(1-menthen-9-yl) aluminium (G). The colourless viscous liquid was shown by $^1$H and $^{13}$C NMR spectroscopy to be a mixture of diastereomeric species, exhibiting no NMR resonances due to AlH or AlOR fragments, but contained traces of limonene.

tris(2,4-Dimethyl-heptyl)aluminium (TDMHPA)

TDMHPA was prepared analogously to TTMBA from the reaction of $CH_2$=C(Me)CH$_2$CHMeCH$_2$CH$_2$Me (97.0 g, 0.769 mol; 98% ex-Wiley) with TIBA (32.3 ml, 0.128 mol, ex-Witco) in dry toluene (ca. 150 ml) in a 500 ml 3-neck flask. The mixture was allowed to reflux for 20 h (range reflux temperature: 115–121° C.), affording ca. 100% of the theoretical amount of isobutene in the dry ice trap. The remaining olefin and solvent were removed in vacuo (70° C., 0.03 mbar, 120 min) to give 51.5 g (99% yield based on TIBA) of tris(2,4-dimethyl-heptyl)aluminium (TDMHPA). The colourless oil was shown by NMR spectroscopy to be a clean 1:1 diasteromeric mixture, showing no sign of AlH or AlOR resonances.

tris(2,4,4-Trimethyl-pentyl)aluminium (TIOA)

This was prepared according to the method described in Liebigs Ann. Chem., Volume 629, Ziegler et al. "Aluminiumtrialkyle und Dialkyl-aluminiumhydride aus Aluminiumisobutyl-Verbindungen [Aluminium trialkyls and dialky-1-aluminium hydrides from aluminium isobutyl compounds]", pages 14–19.

tris(2,5-Dimethyl-hexyl)aluminium (TDMHEA)

TDMHEA was prepared from the reaction of $CH_2$=CMe (CH$_2$CH$_2$CHMe$_2$) (42.3 g, 0.38 mol, ex-Wiley) with TIBA (16.0 mL, 0.061 mol, ex-Witco) in dry m-xylene (64 mL) in a 250 mL 3-neck flask. The mixture was allowed to reflux for 20 h (range reflux: 118–133° C.) affording ca. 100% of the theoretical amount of isobutene in the dry ice trap. A transitory yellow colour was observed on mixing the reagents. The remaining olefin and solvent were removed in vacuo (55° C., 0.3 mbar, 90 min) utilizing a dry ice trap to give 21.3 g (95% yield based on TIBA) of tris(2,5-dimethyl-hexyl)aluminium (TDMHEA). The colourless liquid was shown by $^1$H and $^{13}$C NMR spectroscopy to contain traces of Al—H species, but to be free of AlOR contaminants.

Methylaluminoxane (MAO)

The product available from Witco as a 10% w/w solution in toluene was used.

tris(2-Methyl-propyl)aluminium (TIBA)

The product available from Witco was used.

POLYMERIZATION

Example 1

Polymerization of Propylene

A 5 liter reactor equipped with helical stirrer, steam/water temperature control and a catalyst injection system was heated to 150–160° C. overnight, whilst purging with nitrogen, cooled and then pickled at 70° C. using a mixture of TIBA (0.25 g), toluene (20 ml) and propylene (500 g). The pickle mixture was removed and the reactor then charged with 1650 g liquid propylene, whilst increasing the temperature from 20° C. to 50° C.

Separately, 3.29 g of Al{CH$_2$CHMeCHMeCH$_2$CH$_2$Me}$_3$ (TDMHA, 9.00 mmol) were dissolved in 20 g of toluene in a bottle with a septum cap. The solution was cooled to 0–4° C. using an ice bath, and 81 ml of water (4.5 mmol) added in four shots using a 25 ml syringe, whilst maintaining the temperature below 15° C. and purging the solution with nitrogen. The resulting solution was introduced into the reactor using an injection system, washed in using 20 ml of toluene.

Meanwhile, 9.7 mg of rac-Et(1-Ind)$_2$ZrCl$_2$ (r-EBIZrCl$_2$; 23.2 mmol) were dissolved in 17.6 g of toluene, and 2.57 g of the solution obtained were reacted with 0.11 g TDMHA (0.30 mmol), resulting in a colour change from yellow to light yellow. Ten minutes after the introduction of the hydrolysed alkylaluminium mixture into the reactor, the alkylated zirconocene solution (aged for 5 minutes) was injected into the reactor (using 20 ml toluene). The polymerization was continued for I hour at a constant temperature of 50° C. using 840–1100 rpm stirring. The polymerization was then stopped by injection of 5–10 ml methanol. The heating was then discontinued and the propylene rapidly vented and the powder polypropylene collected. Fouled material was removed using hot toluene and precipitated with methanol. The polypropylene fractions were dried (70–80° C., 200 mbar, nitrogen purge) and combined to give the total yield of polypropylene.

The polymerization conditions and the data relating to the obtained polymer are indicated in Table 1.

Examples 2–5
Polymerization of Propylene

The general procedure described in Example 1 was followed, but using Al{CH$_2$CHMe(CMe$_3$)}$_3$ (TTMBA) as aluminium compound instead of TDMHA and operating with the amounts of metallocene, aluminium compound and water indicated in Table 1. The polymerization conditions and the data relating to the obtained polymer are indicated in Table 1.

Example 6
Polymerization of Propylene

The general procedure described in Example 1 was followed, but using Al{CH$_2$CHMeCHMe$_2$)$_3$ (TDMBA) as aluminium compound instead of TDMHA and operating with the amounts of metallocene, aluminium compound and water indicated in Table 1. The polymerization conditions and the data relating to the obtained polymer are indicated in Table 1.

Example 7
Polymerisation of Propylene

The general procedure described in Example 1 was followed, but using Al{CH$_2$CHMeCHMeCH$_2$Me}$_3$ (TDMPA) as aluminium compound instead of TDMHA and operating with the amounts of metallocene, aluminium compound and water indicated in Table 1. The polymerization conditions and the data relating to the obtained polymer are indicated in Table 1.

Example 8
Polymerisation of Propylene

The general procedure described in Example 1 was followed, but using Al{CH$_2$CHMeCHEt$_2$}$_3$ (TMEPA) as aluminium compound instead of TDMHA and operating with the amounts of metallocene, aluminium compound and water indicated in Table 1. The polymerization conditions and the data relating to the obtained polymer are indicated in Table 1.

Example 9
Polymerisation of Propylene

The general procedure described in Example 1 was followed, but using Al{CH$_2$CHEtCHMe$_2$}$_3$ (TEMBA) as aluminium compound instead of TDMHA and operating with the amounts of metallocene, aluminium compound and water indicated in Table 1. The polymerization conditions and the data relating to the obtained polymer are indicated in Table 1.

Example 10
Polymerisation of Propylene

The general procedure described in Example 1 was followed, but using Al{CH$_2$CHEtCH(Me)Et}$_3$ (TEMPA) as aluminium compound instead of TDMHA and operating with the amounts of metallocene, aluminium compound and water indicated in Table 1. The polymerization conditions and the data relating to the obtained polymer are indicated in Table 1.

Examples 11–13 (Comparison)
Polymerisation of Propylene

The general procedure described in Example 1 was followed but using Al{CH$_2$CHMeCH$_2$CMe$_3$}$_3$ (TIOA), an aluminium compound not envisaged by formula (II) according to the present invention, instead of TDMHA and operating with the amounts of metallocene, aluminium compound and water indicated in Table 1. The polymerization conditions and the data relating to the obtained polymer are indicated in Table 1.

Example 14 (Comparison)
Polymerisation of Propylene

The general procedure described in Example 1 was followed but using Al{CH$_2$CHMeCH$_2$CHMeCH$_2$CH$_2$Me}$_3$ (TDMHPA), an aluminium compound not envisaged by formula (II) according to the present invention, instead of TDMHA and operating with the amounts of metallocene, aluminium compound and water indicated in Table 1. The polymerization conditions and the data relating to the obtained polymer are indicated in Table 1.

Example 15 (Comparison)
Polymerisation of Propylene

The general procedure described in Example 1 was followed but using Al{CH$_2$CHMeCH$_2$CH$_2$C(Me)$_3$}$_3$ (TDMHEA), an aluminium compound not envisaged by formula (II) according to the present invention, instead of TDMHA and operating with the amounts of metallocene, aluminium compound and water indicated in Table 1. The polymerization conditions and the data relating to the obtained polymer are indicated in Table 1.

Example 16 (Comparison)
Polymerisation of Propylene

The general procedure described in Example 1 was followed but using Al{CH$_2$CHMe$_2$}$_3$ (TIBA), an aluminium compound not envisaged by formula (II) according to the present invention, instead of TDMHA and operating with the amounts of metallocene, aluminium compound and water indicated in Table 1. The polymerization conditions and the data relating to the obtained polymer are indicated in Table 1.

Example 17 (Comparison)
Polymerisation of Propylene

The general procedure described in Example 1 was followed with the following changes. A solution of MAO (8.50 mmol) in toluene was introduced into the reactor followed, after 10 minutes, by the product of the reaction of r-EBIZrCl$_2$ (1 mmol) and MAO (0.50 mmol) in toluene, which had been aged for 30 minutes. The polymerization was carried out as described in Example 1. The polymerization conditions and the data relating to the obtained polymer are indicated in Table 1.

Example 18
Polymerisation of Propylene

The general procedure described in Example 1 was followed, but using rac-Me$_2$Si(1-Ind)$_2$ZrCl$_2$ instead of r-EBIZrCl$_2$, and Al{CH$_2$CHMe(CMe$_3$)}$_3$ (TTMBA) instead of TDMHA, and operating with the amounts of metallocene, aluminium compound and water indicated in Table 1. The polymerization conditions and the data relating to the obtained polymer are indicated in Table 1.

Example 19 (Comparison)
Polymerization of Propylene

The general procedure described in Example 19 was followed but using Al{CH$_2$CHMeCH$_2$(CMe$_3$)}$_3$ (TIOA), an aluminium compound not envisaged by formula (II) according to the present invention, instead of TTMBA and operating with the amounts of metallocene, aluminium compound and water indicated in Table 1. The polymerization conditions and the data relating to the obtained polymer are indicated in Table 1.

Example 20 (Comparison)
Polymerization of Propylene

The general procedure described in Example 18 was followed with the following changes. A solution of MAO (8.50 mmol) in toluene (10% w/w) was introduced into the reactor followed, after 10 minutes, by the product of the reaction of rac-Me$_2$Si(1-Ind)$_2$ZrCl$_2$ (1 mmol) and MAO (0.50 mmol) in toluene, which had been aged for 30 minutes. The polymerization was carried out as described in Example 1. The polymerization conditions and the data relating to the obtained polymer are indicated in Table 1.

Example 21
Polymerization of Ethylene

A 1 L jacket-cooled reactor, equipped with an anchor stirrer, was placed under vacuum and heated to 70° C. overnight. A pickle solution of TIBA (0.10 g) in toluene (50 ml) was then added and the mixture was stirred for at least 1 hour, at 50° C. The mixture was removed and the reactor flushed with nitrogen and then charged with iso-octane (300 ml). The reactor was pressurized with ethylene (7 barg) and the temperature maintained at 50° C.

Separately, 0.548 g of Al{CH$_2$CHMeCHMeCH$_2$CH$_2$Me}$_3$ (TDMHA, 1.5 mmol) were dissolved in iso-octane (5 ml) in a bottle with a septum cap. The solution was cooled to 0–4° C., using an ice bath, and 13.5 ml of water (0.75 mmol) added using a 25 ml syringe, whilst maintaining the temperature below 15° C. and purging the solution with nitrogen. The resulting solution was introduced into the reactor within 30 s, via an injection system, using a total amount of 50 ml of iso-octane.

Meanwhile, 6.2 mg of rac-Et(1-Ind)$_2$ZrCl$_2$ (14.8 mmol) were dissolved in 20.0 g of toluene and 0.070 g of the solution obtained (0.052 mmol) was diluted with toluene (1 ml) containing 0.037 g of TDMHA (0.10 mmol). Five minutes after the introduction of the hydrolysed alkylaluminium mixture into the reactor, the alkylated zirconocene solution (aged for 5 min) was injected into the reactor (using a total 50 ml iso-octane). The polymerization was continued for 1 hour, at a constant temperature of 50° C. and a constant pressure of 7 bar; heating was then discontinued and ethylene vented rapidly (2–3 min). The resulting slurry was added to a methanol solution (2% w/w HCl) and filtered. The PE obtained was dried in a vacuum oven (70° C., 100 mbar, nitrogen stream) and the yield determined.

The polymerization conditions and the data relating to the obtained polymer are indicated in Table 2.

Example 22
Polymerization of Ethylene

The general procedure described in Example 21 was followed, but using Al{CH$_2$CHMe(CMe$_3$)}$_3$ (TTMBA) as aluminium compound instead of TDMHA and operating with the amounts of metallocene, aluminium compound and water indicated in Table 2. The polymerization conditions and the data relating to the obtained polymer are indicated in Table 2.

Example 23
Polymerization of Ethylene

The general procedure described in Example 21 was followed, but using Al{CH$_2$CHMeCHMe$_2$}$_3$ (TDMBA) as aluminium compound instead of TDMHA and operating with the amounts of metallocene, aluminium compound and water indicated in Table 2. The polymerization conditions and the data relating to the obtained polymer are indicated in Table 2.

Example 24
Polymerization of Ethylene

The general procedure described in Example 21 was followed, but using Al{CH$_2$CHMeCHMeCH$_2$Me}$_3$ (TDMPA) as aluminium compound instead of TDMHA and operating with the amounts of metallocene, aluminium compound and water indicated in Table 2. The polymerization conditions and the data relating to the obtained polymer are indicated in Table 2.

Example 25
Polymerization of Ethylene

The general procedure described in Example 21 was followed, but using Al{CH$_2$CHMeCHEt$_2$}$_3$ (TMEPA) as aluminium compound instead of TDMHA and operating with the amounts of metallocene, aluminium compound and water indicated in Table 2. The polymerization conditions and the data relating to the obtained polymer are indicated in Table 2.

Example 26
Polymerization of Ethylene

The general procedure described in Example 21 was followed, but using tris(1-menthen-9-yl)aluminium (TMENA) as aluminium compound instead of TDMHA and operating with the amounts of metallocene, aluminium compound and water indicated in Table 2. The polymerization conditions and the data relating to the obtained polymer are indicated in Table 2.

Examples 27–29 (Comparison)
Polymerization of Ethylene

The general procedure described in Example 21 was followed but using Al{CH$_2$CHMeCH$_2$(CMe$_3$)}$_3$ (TIOA), an aluminium compound not envisaged by formula (II) according to the present invention, instead of TDMHA and operating with the amounts of metallocene, aluminium compound and water indicated in Table 2. The polymerization conditions and the data relating to the obtained polymer are indicated in Table 2.

Example 30 (Comparison)
Polymerization of Ethylene

The general procedure described in Example 21 was followed but using Al{CH$_2$CHMeCH$_2$CH$_2$CHMe$_3$}$_3$ (TDMHEA), an aluminium compound not envisaged by formula (II) according to the present invention, instead of TDMHA and operating with the amounts of metallocene, aluminium compound and water indicated in Table 2. The polymerization conditions and the data relating to the obtained polymer are indicated in Table 2.

Example 31 (Comparison)
Polymerization of Ethylene

The general procedure described in Example 21 was followed but using Al{CH$_2$CHMe$_2$}$_3$ (TIBA), an aluminium compound not envisaged by formula (II) according to the present invention, instead of TDMHA and operating with the amounts of metallocene, aluminium compound and water indicated in Table 2. The polymerization conditions and the data relating to the obtained polymer are indicated in Table 2.

Examples 32–33 (Comparison)
Polymerization of Ethylene

The general procedure described in Example 21 was followed with the following changes. A solution of MAO (1.5 mmol) in toluene (10% w/w) was introduced into the reactor using a total of 50 ml of iso-octane. After 5 min, the product of the reaction of r-EBIZrCl$_2$ (0.065 mmol) and MAO (0.1 mmol) in toluene, which had been aged for 5 min, was introduced using a total of 50 ml of iso-octane. The polymerization was carried out as described in Example 12. The polymerization conditions and the data relating to the obtained polymer are indicated in Table 2.

POLYMER CHARACTERIZATION

LVN Analysis

LVN analyses were performed using decahydronapthalene as solvent at 135° C.

GPC Analysis

High temperature GPC analyses were performed using the following chromatographic conditions:

Column: PLgel 2× mixed bed-B, 30 cm, 10 microns

Solvent: 1,2-dichlorobenzene with antioxidant

Flow rate: 1.0 ml/min

Temperature: 140° C.

Detector: refractive index

Calibration: polystyrene

DSC Analysis

DSC analyses were performed on a Perkin Elmer DSC7. The following temperature program was used:

Temp 1: 25° C. Time 1: 1.0 min Rate 1: 10.0° C./min

Temp 2: 160° C. Time 2: 0.1 min Rate 2: 20.0° C./min

Temp 3: 25° C. Time 3: 1.0 min Rate 3: 10.0° C./min

Temp 4: 160° C. Time 4: 0.1 min Rate 4: 20.0° C./min

Temp 5: 25° C.

TABLE 1

Propylene polymerisation using β, γ-branched alkylaluminiums as cocatalyst precursors

| | Metallocene | | Al premix | Cocatalyst | | Al/H$_2$O | Total Al/Zr | Yield | Activity | LVN | M$_n$ × | M$_w$ × | Tm$_2$ |
|---|---|---|---|---|---|---|---|---|---|---|---|---|---|
| Example | Type | μmol | (mmol) | Type | mmol | mol | mol | g pol. | kg/g Zr.h | dl/g | 10$^{-3}$ | 10$^{-3}$ | ° C. |
| 1 | r-EBIZrCl$_2$ | 2.0 | 0.30 | TDMHA | 8.99 | 2 | 4650 | 454 | 2490 | 0.41 | 16.5 | 33.5 | — |
| 2 | r-EBIZrCl$_2$ | 2.0 | 0.20 | TTMBA | 8.91 | 2 | 4560 | 593 | 3250 | 0.41 | 15.3 | 32.6 | 133.9 |
| 3 | r-EBIZrCl$_2$ | 2.0 | 0.20 | TTMBA | 4.81 | 2 | 2510 | 527 | 2890 | 0.39 | — | — | — |
| 4 | r-EBIZrCl$_2$ | 2.0 | 0.20 | TTMBA | 2.99 | 2 | 1600 | 440 | 2410 | 0.39 | — | — | — |
| 5 | r-EBIZrCl$_2$ | 2.0 | 0.20 | TTMBA | 1.51 | 2 | 860 | 281 | 1540 | 0.40 | — | — | — |
| 6 | r-EBIZrCl$_2$ | 2.0 | 0.37 | TDMBA | 9.00 | 2 | 4690 | 525 | 2880 | 0.40 | 14.7 | 34.6 | 133.9 |
| 7 | r-EBIZrCl$_2$ | 2.0 | 0.30 | TDMPA | 9.00 | 2 | 4650 | 570 | 3130 | 0.41 | 17.4 | 33.8 | — |
| 8 | r-EBIZrCl$_2$ | 2.0 | 0.30 | TMEPA | 9.00 | 2 | 4650 | 567 | 3110 | 0.53 | 15.8 | 33.7 | — |
| 9 | r-EBIZrCl$_2$ | 3.0 | 0.34 | TEMBA | 10.2 | 2.3 | 3500 | 780 | 2850 | — | — | — | — |
| 10 | r-EBIZrCl$_2$ | 3.0 | 0.30 | TEMPA | 9.00 | 2 | 3100 | 760 | 3470 | — | — | — | — |
| 11 (Comp) | r-EBIZrCl$_2$ | 1.0 | 0.10 | TIOA | 9.00 | 2 | 9100 | 151 | 1660 | 0.44 | — | — | — |
| 12 (Comp) | r-EBIZrCl$_2$ | 2.0 | 0.20 | TIOA | 9.01 | 2 | 4610 | 323 | 1770 | 0.43 | 16.6 | 34.4 | 134.6 |
| 13 (Comp) | r-EBIZrCl$_2$ | 3.0 | 0.30 | TIOA | 9.00 | 2 | 3100 | 470 | 1720 | 0.41 | — | — | — |
| 14 (Comp) | r-EBIZrCl$_2$ | 3.0 | 0.30 | TDMHPA | 9.00 | 2 | 3100 | 129 | 470 | 0.42 | — | — | — |
| 15 (Comp) | r-EBIZrCl$_2$ | 3.0 | 0.31 | TDMHEA | 9.00 | 2 | 3100 | 150 | 550 | — | — | — | — |
| 16 (Comp) | r-EBIZrCl$_2$ | 3.0 | 0.30 | TIBA | 9.00 | 2 | 3100 | 36 | 130 | 0.45 | 21.2 | 41.3 | — |
| 17 (Comp) | r-EBIZrCl$_2$ | 1.0 | 0.50 | MAO | 8.50 | — | 3000 | 211 | 2310 | 0.46 | 19.0 | 38.1 | 133.9 |
| 18 | r-Me$_2$Si(Ind)$_2$-ZrCl$_2$ | 3.0 | 0.30 | TTMBA | 9.00 | 2 | 3100 | 423 | 1550 | 0.56 | — | — | — |
| 19 (Comp) | r-Me$_2$Si(Ind)$_2$-ZrCl$_2$ | 3.0 | 0.30 | TIOA | 9.00 | 2 | 3100 | 89 | 325 | 0.57 | — | — | — |
| 20 (Comp) | r-Me$_2$Si(Ind)$_2$-ZrCl$_2$ | 1.0 | 0.50 | MAO | 8.50 | — | 3000 | 205 | 2700 | 0.68 | — | — | — |

TABLE 2

Ethylene polymerisation using β, γ-branched alkylaluminiums as cocatalyst precursors

| | Metallocene | | | Cocatalyst | | Total | | | | | | | |
|---|---|---|---|---|---|---|---|---|---|---|---|---|---|
| Example | Type | µmol | Al premix (mmol) | Type | mmol | Al/H₂O mol | Al/Zr mol × 10⁻³ | Yield g pol. | Activity ton/g Zr.h | LVN dl/g | $M_n \times 10^{-3}$ | $M_w \times 10^{-3}$ | $Tm_2$ °C. |
| 21 | r-EBIZrCl₂ | 0.052 | 0.10 | TDMHA | 1.50 | 2 | 30.8 | 29.3 | 6.2 | 4.78 | 76.8 | 329.0 | — |
| 22 | r-EBIZrCl₂ | 0.039 | 0.10 | TTMBA | 1.50 | 2 | 41.0 | 51.6 | 14.5 | 3.67 | 102.0 | 457.0 | 131.7 |
| 23 | r-EBIZrCl₂ | 0.051 | 0.10 | TDMBA | 1.50 | 2 | 31.6 | 46.0 | 9.9 | 4.83 | 99.2 | 456.5 | 131.5 |
| 24 | r-EBIZrCl₂ | 0.061 | 0.10 | TDMPA | 1.50 | 2 | 26.2 | 54.2 | 9.7 | 4.71 | 99.6 | 458.5 | — |
| 25 | r-EBIZrCl₂ | 0.052 | 0.10 | TMEPA | 1.50 | 2 | 30.8 | 48.2 | 10.2 | 2.62 | 51.5 | 198.5 | — |
| 26 | r-EBIZrCl₂ | 0.050 | 0.07 | TMENA | 1.50 | 2 | 30.0 | 48.0 | 10.5 | — | — | — | — |
| 27 (Comp) | r-EBIZrCl₂ | 0.052 | 0.10 | TIOA | 1.50 | 2 | 30.8 | 14.6 | 3.1 | 2.45 | 56.3 | 188.0 | 134.2 |
| 28 (Comp) | r-EBIZrCl₂ | 0.108 | 0.10 | TIOA | 1.50 | 2 | 14.8 | 28.8 | 2.9 | 3.11 | — | — | — |
| 29 (Comp)* | r-EBIZrCl₂ | 0.500 | 0.10 | TIOA | 1.50 | 2 | 3.2 | 34.4 | 2.3 | 2.84 | — | — | — |
| 30 (Comp) | r-EBIZrCl₂ | 0.050 | 0.07 | TDMHEA | 1.50 | 2 | 30.0 | 5.0 | 1.1 | — | 48.2 | 136.0 | — |
| 31 (Comp) | r-EBIZrCl₂ | 0.209 | 0.10 | TIBA | 1.50 | 2 | 7.7 | 2.6 | 0.14 | 1.93 | 44.8 | 126.0 | — |
| 32 (Comp) | r-EBIZrCl₂ | 0.065 | 0.10 | MAO | 1.50 | — | 24.6 | 2.1 | 0.35 | 2.16 | 48.1 | 117.5 | 132.6 |
| 33 (Comp) | r-EBIZrCl₂ | 0.221 | 0.10 | MAO | 1.50 | — | 7.2 | 13.2 | 0.66 | 2.17 | — | — | — |

*polymerisation time 20 min.

What is claimed is:

1. A catalyst for the polymerization of olefins comprising the product obtained by contacting the following components:

(A) a cyclopentadienyl compound of formula (I):

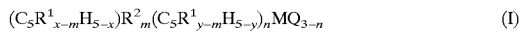

$$(C_5R^1_{x-m}H_{5-x})R^2_m(C_5R^1_{y-m}H_{5-y})_nMQ_{3-n} \quad (I)$$

in which M is Ti, Zr or HF, $C_5R^1_{x-m}H_{5-x}$ and $C_5R^1_{y-m}H_{5-y}$ are equally or differently substituted cyclopentadienyl rings, the substituents $R^1$, the same or different from each other, are selected from the group consisting of a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl groups radicals, optionally containing Si or Ge atoms or $Si(CH_3)_3$ groups, or two or four substituents $R^1$ of the same cyclopentadienyl group form one or two rings, having 4 to 6 carbon atoms; $R^2$ is a bridging group between the two cyclopentadienyl rings and is selected from the group consisting of $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, wherein the substituents $R^3$, the same or different from each other, are hydrogen or have the same meaning of $R^1$, or two or four substituents $R^3$ form one or two rings, having 3 or 6 carbon atoms; the substituents Q, the same or different from each other, are selected from the group consisting of halogen, hydrogen, $R^1$, $OR^1$, $SR^1$, $NR^1_2$ and $PR^1_2$; m is 0 or 1; n is 0 or: 1, being 1 when m=1; x ranges from (m+1) to 5; and y ranges from m to 5;

(B) an organometallic aluminium compound of the formula (II):

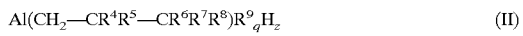

$$Al(CH_2-CR^4R^5-CR^6R^7R^8)R^9_qH_z \quad (II)$$

wherein $R^4$ is a linear or branched, saturated or unsaturated $C_1$–$C_{10}$ alkyl or $C_7$–$C_{20}$ arylalkyl group; $R^5$ is hydrogen or a linear or branched, saturated or unsaturated $C_1$–$C_{10}$ alkyl or $C_7$–$C_{10}$ arylalkyl group; $R^6$ and $R^7$, the same or different from each other, are linear or branched, saturated or unsaturated $C_1$–$C_{10}$ alkyl, $C_6$–$C_{10}$ aryl, $C_7$–$C_{10}$ arylalkyl or alkylaryl groups; the substituents $R^4$ and $R^6$ and/or $R^6$ and $R^7$ optionally form one or two rings, having 3 to 6 carbon atoms; $R^8$ is hydrogen or a linear or branched, saturated or unsaturated $C_1$–$C_{10}$ alkyl, $C_6$–$C_{10}$ aryl, $C_7$–$C_{10}$ arylalkyl or $C_7$–$C_{10}$ alkylaryl group; $R^9$ is a linear or branched, saturated or unsaturated $C_1$–$C_{10}$ alkyl or $C_7$–$C_{10}$ arylalkyl group, a carbon atom in the compound of formula (II) being optionally replaced by a Si or a Ge atom; w is 1, 2 or 3; z is 0 or 1; q=3–w–z; and (C) water; the molar ratio between said organometallic aluminium compound (B) and said water (C) being comprised between 1:1 and 100:1.

2. The catalyst according to claim 1, wherein the molar ratio between said organometallic aluminium compound (B) and said water (C) is 2.

3. The catalyst according to claim 1, wherein the molar ratio between said organometallic aluminium compound (B) and said cyclopentadienyl compound (A) ranges from 50 to 50,000.

4. The catalyst according to claim 1 wherein, in said cyclopentadienyl compound of the formula (I), the metal M is zirconium.

5. The catalyst according to clam 1 wherein, in said cyclopentadienyl compound of the formula (I), m=0; $C_5R^1_{x-m}H_{5-x}$ and $C_5R^1_{y-m}H_{5-y}$ are selected from the group consisting of pentamethyl-cyclopentadienyl, indenyl and 4,5,6,7-tetrahydroindenyl; and the Q substituents are chlorine atoms or methyl groups.

6. The catalyst according to claim 1 wherein, in said cyclopentadienyl compound of the formula (1), m =1; $C_5R^1_{x-m}H_{5-x}$ and $C_5R^1_{y-m}H_{5-y}$ are selected from the group consisting of tetramethyl-cyclopentadienyl, indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5, 6,7-tetrahydroindenyl and fluorenyl groups; $R^2$ is $(CH_3)_2Si<$ or —$CH_2CH_2$—; the Q substituents are chlorine or methyl groups.

7. The catalyst according to claim 1 wherein, in said organometallic aluminium compound of formula (II), $R^4$ is a $C_1$–$C_5$ alkyl group, $R^5$ is a hydrogen atom, $R^6$ and $R^7$ are $C_1$–$C_5$ alkyl groups, $R^8$ is hydrogen or a $C_1$–$C_5$ alkyl group, w is 2 or 3 and, when q is different from 0, $R^9$ is a branched $C_1$–$C_5$ alkyl group.

8. The catalyst according to claim 7 wherein, in said organometallic aluminium compound of formula (II), $R^4$ is methyl or ethyl.

9. The catalyst according to claim 7 wherein, in said organometallic aluminium compound of formula (II), q is different from 0 and $R^9$ is isobutyl.

10. The catalyst according to claim 1, wherein said organometallic aluminium compound of formula (II) is tris(2,3,3-trimethyl-butyl)aluminium.

11. The catalyst according to claim 1, wherein said component (B) is a mixture of two organometallic aluminium compounds of formula (II), wherein z=0 and z=1, so that the molar ratio between the hydrogen atoms directly bound to aluminium and aluminium atoms is lower than 0.8.

12. The catalyst according to claim 11, wherein said molar ratio between the hydrogen atoms directly bound to aluminium and aluminium atoms ranges from 0.05 to 0.3.

13. A catalyst for the polymerization of olefins comprising the product obtained by contacting the following components:

(A) a cyclopentadienyl compound of formula (I):

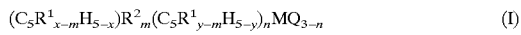

$(C_5R^1_{x-m}H_{5-x})R^2_m(C_5R^1_{y-m}H_{5-y})_nMQ_{3-n}$ (I)

in which M is Ti, Zr or Hf, $C_5R^1_{x-m}H_{5-x}$ and $C_5R^1_{y-m}H_{5-y}$ are equally or differently substituted cyclopentadienyl rings, the substituents $R^1$, the same or different from each other, are selected from the group consisting of a linear or branched, saturate or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl groups radicals, optionally containing Si or Ge atoms or $Si(CH_3)_3$ groups, or two or four substituents $R^1$ of the same cyclopentadienyl group form one or two rings, having 4 to 6 carbon atoms; $R^2$ is a bridging group between the two cyclopentadienyl rings and is selected from the group consisting of $CR^3_2$, $C_2R^3_4$; $SiR^3_2$, $Si_2R^3_4$, $GeR^3_2$, $Ge_2R^3_4$, $R^3_2SiCR^3_2$, $NR^1$ and $PR^1$, wherein the substituents $R^3$, the same or different from each other, are hydrogen or have the same meaning of $R^1$, or two or four substituents $R^3$ form one or two rings, having 3 or 6 carbon atoms; the substituents Q, the same or different from each other, are selected from the group consisting of halogen, hydrogen, $R^1$, $OR^1$, $SR^1$, $NR^1_2$ and $PR^1_2$; m is 0 or 1; n is 0 or 1, being 1 when m=1; x ranges from (m+1) to 5; and y ranges from m to 5;

(B) the product of the reaction between water and an organometallic aluminium compound of formula (II):

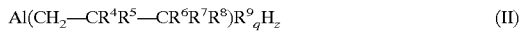

$Al(CH_2—CR^4R^5—CR^6R^7R^8)R^9_qH_z$ (II)

wherein $R^4$ is a linear or branched, saturated or unsaturated $C_1$–$C_{10}$ alkyl or $C_7$–$C_{20}$ arylalkyl group; $R^5$ is hydrogen or a linear or branched, saturated or unsaturated $C_1$–$C_{10}$ alkyl or $C_7$–$C_{10}$ arylalkyl group; $R^8$ and $R^7$, the same or different from each other, are linear or branched, saturated or unsaturated $C_1$–$C_{10}$ alkyl, $C_6$–$C_{10}$ aryl, $C_7$–$C_{10}$ arylalkyl or alkylaryl groups; the substituents $R^4$ and $R^6$ and/or $R^6$ and $R^7$ optionally form one or two rings, having 3 to 6 carbon atoms; $R^8$ is hydrogen or a linear or branched, saturated or unsaturated $C_1$–$C_{10}$ alkyl, $C_6$–$C_{10}$ aryl, arylalkyl or $C_7$–$C_{10}$ alkylaryl group; $R^9$ is a linear or branched, saturated or unsaturated $C_1$–$C_{10}$ alkyl or $C_7$–$C_{10}$ arylalkyl group, a carbon atom in the compound of formula (II) being optionally replaced by a Si or a Ge atom; w is 1, 2 or 3; z is 0 or 1; q=3–w–z; and the molar ratio between said organometallic aluminium compound and said water being comprised between 1:1 and 100:1.

14. A process comprising polymerization of an olefin in the presence of a catalyst according to claim 1.

15. The process according to claim 14, wherein said olefin is an α-olefin of formula $CH_2=CHR$, wherein R is hydrogen or a $C_1$–$C_{20}$ alkyl radical.

16. The process according to claim 15, wherein ethylene is homopolymerized.

17. The process according to claim 15, wherein ethylene is copolymerized with an α-olefin of formula $CH_2=CHR$, wherein R is a linear, branched or cyclic $C_1$–$C_{20}$ alkyl radical, or with a cycloolefin, and optionally with a polyene.

18. The process according to claim 17, wherein said α-olefin is selected from the group consisting of propylene, 1-butene, 4-methyl-1-pentene, 1-hexene and 1-octene.

19. The process according to claim 17, wherein an elastomeric copolymer of ethylene is obtained, said copolymer containing from 15 to 85 mol % of ethylene units, the complement to 100% consisting of units of one or more α-olefins and/or of a non-conjugated diolefin able to cyclopolymerize.

20. The process according to claim 19, wherein said copolymer contains from 0.1 to 5% by moles of polyene units.

* * * * *